UNITED STATES PATENT OFFICE.

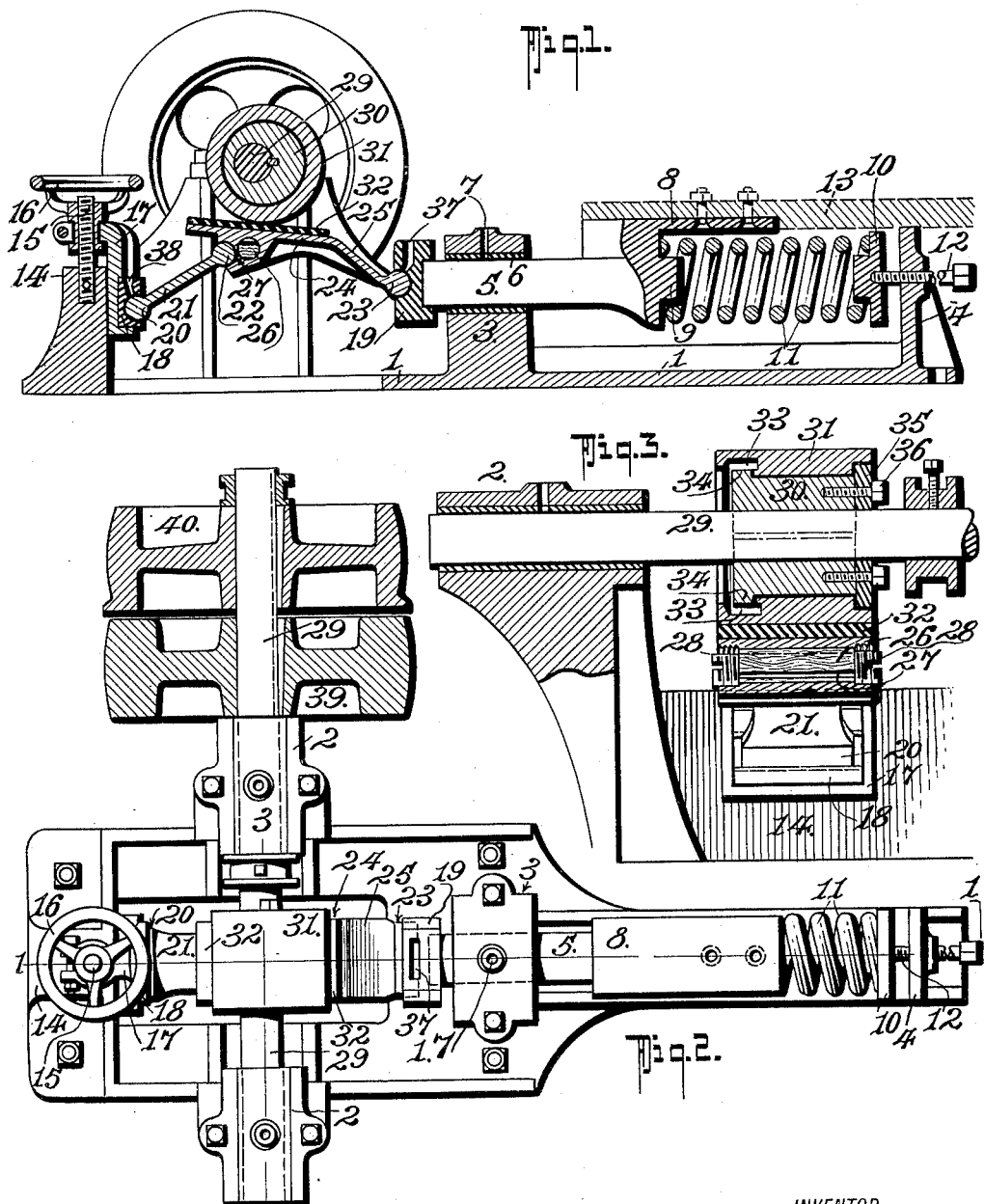

FRANK FRANZ, OF WALLACE, IDAHO, ASSIGNOR OF ONE-HALF TO E. R. DAY, OF WALLACE, IDAHO.

HEAD-MOTION.

1,089,633. Specification of Letters Patent. Patented Mar. 10, 1914.

Application filed January 30, 1912. Serial No. 674,307.

*To all whom it may concern:*

Be it known that I, FRANK FRANZ, residing at Wallace, in the county of Shoshone and State of Idaho, have invented certain new and useful Improvements in Head-Motions, of which the following is a specification.

My invention is an improved mechanical device for imparting longitudinal reciprocation to ore concentrating tables, and the invention particularly resides in those novel features of construction, combination and arrangement of parts, all of which will be first fully described, and then be specifically pointed out in the appended claims, reference being had to the accompanying drawings, in which:—

Figure 1 is a vertical longitudinal section on the line 1—1 of Fig. 2. Fig. 2 is a top plan view and part horizontal section of my invention. Fig. 3 is a detail cross section on the line 3—3 of Fig. 2.

In the drawings in which like numerals and letters of reference indicate like parts in all the figures, 1 designates the base or support, which is provided with suitable bearings 2—2, for the driving shaft 29, and which is also provided with a bearing 3 for the pusher pin or rod 5 which is carried on the bracket 8 to which the table 13 is bolted. The base 1 also includes the standard 4 in which the adjusting screw 12, that engages the spring block 10, is mounted.

9 designates a boss projecting in alinement with the rod 5, and over which, the end of the spring 10 is fitted.

7 designates an oiling aperture for the bearing 6, which is lined with suitable bearing metal as indicated.

14 is a standard which supports a screw 15 on which a hand wheel 16, is mounted, the hand wheel 16 having a grooved collar to receive the adjusting members 17, which carries the socket block 18. The block 18 is provided with a socket in which the cylindrical head 20 of the link 21, is mounted. The block 18 is provided with an oiling duct 38 for the bearing head 20, as indicated. 19 is another socket block which is fitted over the end of the rod 5, and has a socket to receive the cylindrical head 23 of the main toggle member 25. The block 19 is also provided with an oil duct 37, as indicated. The main toggle member 25 has a table portion 24, on which a wear plate 32 of fiber or the like is mounted, and the table 24 has a lubricant pocket 26, in which suitable lubricant is held, to flow through an oil duct 27 to the socket bearing that receives the cylindrical bearing head 22 of the supplemental toggle link 21. The oil pocket is filled with waste and oil and closed two-thirds from the bottom.

28 designates a plug for closing the oil pocket 26.

The shaft 29 carries a cam 30 that operates in a ring 31, the cam 30 having a shouldered portion 34 and being provided with a cap plate 35 to retain the ring 31 in place. The ring 31 is provided with an oil pocket 33 to collect and retain the necessary lubricant. The plate 35 is held on by bolts 36 as best indicated in Fig. 3 of the drawings.

39 is the fly wheel, also the belt pulley.

40 is the loose pulley so the machine can be stopped when desired.

In the practical operation of the invention, motion is imparted to the shaft 29, which turns the cam 30 in one direction or the other, thereby causing an opposite rotary movement to take place in the ring 31. As the cam 30 turns, the plate 32 will be moved downwardly, and thus cause a separation to take place between the blocks 18 and 19, thereby moving the pin or rod 5 from left to right in Fig. 1, against the tension of the spring 11. As the shaft 29 turns farther to raise the cam 30, the spring 11 will move the block 19 toward the block 18, and consequently hold the plate 32 in continuous contact with the ring 31.

In order to adjust the stroke of the rod 5, and consequently the stroke of the table 13, it is necessary to but raise or lower the bearing 18 by turning the hand wheel 16.

From the foregoing description taken in connection with the accompanying drawings it is thought the complete construction, operation, and advantages of the application will be apparent to those skilled in the art to which it appertains.

What I claim is:—

1. In a head motion for ore concentrators, a supporting frame, a bracket member having a shaft or pin, a bearing on said frame in which said shaft or pin is mounted, yieldable means coöperative with said pin and bracket and continuously tending to move said bracket in one direction, an abutment carried by said frame and spaced from said bearing, a shaft rotatably mounted between said abutments and in a plane above the same, and extending in a direction transverse to the axis of said pin, a bearing member adjustably mounted on said abutment and including a socket portion, a bearing member carried by said pin, and also including a socket portion, a cam mounted on said transverse shaft, a main toggle lever including a flat upper bearing surface adapted to be held up in contact with said cam, and also including a downwardly projecting portion terminating in a bearing end to enter the socket of said pin carried bearing member, said main toggle member including a bearing socket beneath said flat surface, and a downwardly projecting toggle link having a bearing end held in said last named socket, and having a second bearing head held in the bearing socket of said adjustable bearing member, all being arranged whereby said yieldable means will also serve to hold said main toggle member in contact with said cam at all times, substantially as shown and for the purposes described.

2. In a head motion, a supporting frame, a bearing mounted thereon, a bracket member having a rod portion slidable in said bearing, a bearing block mounted on the end of said rod portion, said frame including an abutment, a bearing block engaging said abutment, a main toggle member having a bearing end engaging said bracket rod bearing member, a second toggle member having bearing members for engaging said abutment bearing member and said first toggle member, a wear plate mounted on said first toggle member, a rotatable shaft, a cam on said rotatable shaft for effecting the movement of said toggle member, and resilient means continuously tending to move said bracket member in a direction to continuously tend to move said toggle members toward said shaft.

3. In a head motion, a supporting frame, a bearing mounted thereon, a bracket member having a rod portion slidable in said bearing, a bearing block mounted on the end of said rod portion, said frame including an abutment, a bearing block engaging said abutment, a main toggle member having a bearing end engaging said bracket rod bearing member, a second toggle member having bearing members for engaging said abutment bearing member and said first toggle member, a wear plate mounted on said first toggle member, a rotatable shaft, a cam on said rotatable shaft for effecting the movement of said toggle member, and resilient means continuously tending to move said bracket member in a direction to continuously tend to move said toggle members toward said shaft, a ring loosely mounted on said cam to engage said first mentioned toggle member, and means for adjusting the stroke of said bracket member.

4. In a head motion, a base or support having an abutment and a bearing member, a bracket member having a rod portion mounted in said bearing member, other bearing members carried by said support, an operating shaft rotatably mounted in said other bearing members, a cam on said shaft, a ring loosely mounted on said cam, a bearing member mounted on said bracket rod, a bearing member mounted on said abutment, a main and a secondary toggle member connecting said bearing members, said main toggle member including a table portion coöperative with said cam carried ring, and means continuously tending to move said table member toward said ring.

5. In a head motion, a base or support having an abutment and a bearing member, a bracket member having a rod portion mounted in said bearing member, other bearing members carried by said support, an operating shaft rotatably mounted in said other bearing members, a cam on said shaft, a ring loosely mounted on said cam, a bearing member mounted on said bracket rod, a bearing member mounted on said abutment, a main and a secondary toggle member connecting said bearing members, said main toggle member including a table portion coöperative with said cam carried ring, and means continuously tending to move said table member toward said ring, and a wear plate mounted on said table member to engage said ring.

6. In a head motion a base or support having an abutment and a bearing member, a bracket member having a rod portion mounted in said bearing member, other bearing members carried by said support, an operating shaft rotatably mounted in said other bearing members, a cam on said shaft, a ring loosely mounted on said cam, a bearing member mounted on said bracket rod, a bearing member mounted on said abutment, a main and a secondary toggle member connecting said bearing members, said main toggle member including a table portion coöperative with said cam carried ring, and means continuously tending to move said table member toward said ring, and a wear plate mounted on said table member to engage said ring, and means for adjusting said abutment bearing to vary the stroke of said bracket member.

7. In a head motion a base or support having an abutment and a bearing member, a bracket member having a rod portion mounted in said bearing member, other bearing members carried by said support, an operating shaft rotatably mounted in said other bearing members, a cam on said shaft, a ring loosely mounted on said cam, a bearing member mounted on said rod portion, a bearing member mounted on said abutment, a main and a secondary toggle member connecting said bearing members, said main toggle member including a table portion coöperative with said cam carried ring, and means continuously tending to move said table member toward said ring, and a wear plate mounted on said table member to engage said ring, and means for delivering lubricant to the moving parts.

FRANK FRANZ.

Witnesses:
   W. L. LUCAS,
   W. S. TOWER.

Copies of this patent may be obtained for five cents each, by addressing the "Commissioner of Patents, Washington, D. C."